United States Patent
Wu et al.

(10) Patent No.: US 12,086,179 B2
(45) Date of Patent: Sep. 10, 2024

(54) METHOD AND APPARATUS FOR INFORMATION DISPLAY, AND NON-VOLATILE COMPUTER STORAGE MEDIUM

(71) Applicant: Beijing Bytedance Network Technology Co., Ltd., Beijing (CN)

(72) Inventors: Ping Wu, Beijing (CN); Ruiqi Peng, Beijing (CN); Kai Wu, Beijing (CN)

(73) Assignee: Beijing Bytedance Network Technology Co., Ltd. (CN)

( * ) Notice: Subject to any disclaimer, the term of this patent is extended or adjusted under 35 U.S.C. 154(b) by 0 days.

(21) Appl. No.: 18/455,189

(22) Filed: Aug. 24, 2023

(65) Prior Publication Data

US 2023/0401256 A1    Dec. 14, 2023

Related U.S. Application Data

(63) Continuation of application No. PCT/CN2022/079632, filed on Mar. 8, 2022.

(30) Foreign Application Priority Data

Apr. 26, 2021   (CN) .......................... 202110453428.1

(51) Int. Cl.
*G06F 16/70*    (2019.01)
*G06F 16/732*   (2019.01)
(Continued)

(52) U.S. Cl.
CPC .......... *G06F 16/735* (2019.01); *G06F 16/732* (2019.01); *G06F 16/7335* (2019.01);
(Continued)

(58) Field of Classification Search
CPC .. G06F 16/735; G06F 16/7335; G06F 16/738; G06F 16/74; G06F 16/732; G06F 16/7867
See application file for complete search history.

(56) References Cited

U.S. PATENT DOCUMENTS

2006/0129446 A1*   6/2006   Ruhl .................. G06Q 30/0282
                                                       705/306
2009/0327236 A1*  12/2009   Denney .................. G06F 16/70
(Continued)

FOREIGN PATENT DOCUMENTS

CN         106294479 A      1/2017
CN         108197242 A      6/2018
(Continued)

OTHER PUBLICATIONS

First Office Action issued Nov. 21, 2022 in Chinese Application No. 202110453428.1, with English translation (20 pages).
(Continued)

*Primary Examiner* — Mahesh H Dwivedi

(57) ABSTRACT

The present disclosure provides a method and apparatus for information display, and a non-volatile computer storage medium. The method includes: displaying search prompt information in response to a trigger operation for review content corresponding to a video; and displaying a search result page in response to a selection operation for the search prompt information.

17 Claims, 13 Drawing Sheets

(51) Int. Cl.
*G06F 16/735* (2019.01)
*G06F 16/738* (2019.01)
*G06F 16/74* (2019.01)
*G06F 16/78* (2019.01)

(52) U.S. Cl.
CPC ............ *G06F 16/738* (2019.01); *G06F 16/74* (2019.01); *G06F 16/7867* (2019.01)

(56) References Cited

U.S. PATENT DOCUMENTS

| | | | | |
|---|---|---|---|---|
| 2012/0131032 | A1* | 5/2012 | Rakshit | G06F 16/954 707/E17.069 |
| 2015/0302012 | A1* | 10/2015 | Bhagat | G06F 16/9558 707/734 |
| 2018/0060340 | A1* | 3/2018 | Hazra | G06F 16/90324 |
| 2018/0329582 | A1* | 11/2018 | Clediere | G06Q 30/0241 |
| 2020/0151777 | A1 | 5/2020 | Casalino et al. | |
| 2020/0349210 | A1 | 11/2020 | Kawamoto | |
| 2021/0365521 | A1* | 11/2021 | Yusuf | G06F 3/04855 |
| 2023/0177265 | A1* | 6/2023 | Hwang | G06F 40/284 704/9 |

FOREIGN PATENT DOCUMENTS

| | | | | |
|---|---|---|---|---|
| CN | 108932253 | A | | 12/2018 |
| CN | 110457547 | A | | 11/2019 |
| CN | 111163348 | A | | 5/2020 |
| CN | 111259173 | A | | 6/2020 |
| CN | 111368185 | A | | 7/2020 |
| CN | 111475729 | A | | 7/2020 |
| CN | 112328872 | A | | 2/2021 |
| CN | 113157970 | A | | 7/2021 |
| CN | 114938473 | A * | 8/2022 | |
| CN | 111259173 | B * | 3/2023 | ........... G06F 16/435 |
| WO | 2018062795 | A1 | | 4/2018 |

OTHER PUBLICATIONS

International Search Report issued Jun. 8, 2022 in International Application No. PCT/CN2022/079632, with English translation (5 pages).
Extended EP Search Report dated May 28, 2024 issued in EP Appl. No. 22794345.3 (12 pages).

* cited by examiner

METHOD AND APPARATUS FOR INFORMATION DISPLAY, AND NON-VOLATILE COMPUTER STORAGE MEDIUM

CROSS-REFERENCE TO RELATED APPLICATIONS

The present disclosure is a U.S. National Stage Application under 35 U.S.C. § 371 of International Patent Application No. PCT/CN2022/079632, filed on Mar. 8, 2022, which is based on and claims priority to the Chinese Patent Application No. 202110453428.1 filed on Apr. 26, 2021, the disclosure of which is incorporated by reference herein in its entirety.

TECHNICAL FIELD

The present disclosure relates to the field of Internet technologies, and in particular, to a method and apparatus of information presentation, and a non-transitory computer storage medium.

BACKGROUND

With the continuous development of Internet technologies, a user can acquire various information on a terminal application or website.

When the user acquires information using the terminal application or website, there might exist some contents not understood by the user; if the user wants to have a detailed understanding of the content, the user needs to exit an information acquisition interface and take the content as a search word for searching, to acquire detailed information of the content.

SUMMARY

Embodiments of the present disclosure at least provide a method and apparatus of information presentation, and a non-transitory computer storage medium.

In a first aspect, an embodiment of the present disclosure provides a method of information presentation, comprising: in response to a triggering operation on a comment content corresponding to a video, presenting search prompt information; and in response to a selection operation on the search prompt information, presenting a search result page, wherein at least one search recommendation word is presented in a first area in the search result page, the search recommendation word being matched with the comment content and/or the video; and any search recommendation word in the at least one search recommendation word is presented in a search box of the search result page, and a video search result corresponding to the any search recommendation word is presented in a second area of the search result page.

In some embodiments, the comment content comprises a plurality of comment contents, and at least one target comment content in the comment content and at least one first search recommendation word matched with a keyword in the target comment content are presented in the first area.

In some embodiments, at least one second search recommendation word not appearing in the target comment content and associated with the video is further presented in the first area.

In some embodiments, the method further comprises: performing highlighted display on the at least one first search recommendation word presented in the first area and the keyword matched with the first search recommendation word in the target comment content associatively.

In some embodiments, target entities described by the first search recommendation word and the keyword matched with the first search recommendation word are same.

In a possible implementation, the search prompt information comprises a target recommendation word, which is a search recommendation word selected from the at least one search recommendation word and having a highest matching degree with the target comment content.

In some embodiments, the first search recommendation is determined according to the following steps: selecting an entity word and/or a description word related to the video according to a preset strategy, based on the target comment content, as the first search recommendation word; and/or selecting entity words and/or description words related to the video according to a preset strategy, based on the target comment content, as first candidate search recommendation words, and selecting the first search recommendation word according to interaction data of the first candidate search recommendation words.

In some embodiments, the second search recommendation is determined according to the following steps: determining the second search recommendation word according to search data input after the video is browsed, and/or feature text corresponding to the video.

In some embodiments, the method further comprises: in response to a triggering operation on any other search recommendation word presented in the first area than the any search recommendation word corresponding to the current video search result, switching to present the any other search recommendation word in the search box of the search result page; and switching to present a video search result corresponding to the any other search recommendation word in the second area of the search result page.

In a second aspect, the present disclosure provides an apparatus of information presentation, comprising: a first response module configured to, in response to a triggering operation on a comment content corresponding to a video, present search prompt information; and a second response module configured to, in response to a selection operation on the search prompt information, present a search result page, wherein at least one search recommendation word is presented in a first area of the search result page, the search recommendation word being matched with the comment content and/or the video; and any search recommendation word in the at least one search recommendation word is presented in a search box of the search result page, and a video search result corresponding to the any search recommendation word is presented in a second area of the search result page.

In some embodiments, the comment content comprises a plurality of comment contents, and at least one target comment content in the comment content and at least one first search recommendation word matched with a keyword in the target comment content are presented in the first area.

In some embodiments, at least one second search recommendation word not appearing in the target comment content and associated with the video is further presented in the first area.

In some embodiments, the apparatus further comprises: a display module configured to perform highlighted association display on the at least one first search recommendation word presented in the first area and the keyword matched with the first search recommendation word in the target comment content.

In some embodiments, target entities described by the first search recommendation word and the keyword matched with the first search recommendation word are same.

In some embodiments, the search prompt information comprises a target recommendation word, which is a search recommendation word selected from the at least one search recommendation word and having a highest matching degree with the target comment content.

In some embodiments, the apparatus further comprises: a first determination module configured to select an entity word and/or a description word related to the video according to a preset strategy, based on the target comment content, as the first search recommendation word; and/or select entity words and/or description words related to the video according to a preset strategy, based on the target comment content, as first candidate search recommendation words, and select the first search recommendation word according to interaction data of the first candidate search recommendation words.

In some embodiments, the apparatus further comprises: a second determination module configured to determine the second search recommendation word according to search data input after the video is browsed, and/or feature text corresponding to the video.

In some embodiments, the apparatus further comprises: a third response module configured to, in response to a triggering operation on any other search recommendation word presented in the first area than the any search recommendation word corresponding to the current video search result, switch to present the any other search recommendation word in the search box of the search result page; and switch to present a video search result corresponding to the any other search recommendation word in the second area of the search result page.

In a third aspect, an alternative implementation of the present disclosure further provides a computer device, comprising: a processor, and a memory, the memory having therein stored machine-readable instructions executable by the processor, the processor being configured to execute the machine-readable instructions stored in the memory, and when the machine-readable instructions are executed by the processor, perform the steps of the method of information presentation according to the first aspect or any of the possible implementations of the first aspect described above.

In a fourth aspect, an alternative implementation of the present disclosure further provides a computer-readable storage medium having a computer program stored thereon, which, when executed by a processor, performs the steps of the method of information presentation according to the first aspect or any of the possible implementations of the first aspect described above.

In a fifth aspect, the present disclosure provides a computer program comprising: instructions, which when executed by a processor, cause the processor to perform the method of information presentation in any of the above embodiments.

In a sixth aspect, the present disclosure provides a computer program product, which when run on a computer, causes the computer to perform the method of information presentation in any of the above embodiments.

In order to make the aforementioned objectives, features and advantages of the present disclosure more apparent and understandable, preferred embodiments are provided hereinafter, and described in detail in conjunction with the attached accompanying drawings as follows.

BRIEF DESCRIPTION OF THE DRAWINGS

In order to more clearly illustrate the technical solutions of the embodiments of the present disclosure, the drawings needing to be used in the embodiments will be briefly described below, the drawings herein are incorporated in and constitute a part of this specification, and these drawings illustrate the embodiments consistent with the present disclosure and, together with the description, serve to explain the technical solutions of the present disclosure. It should be understood that the following drawings illustrate only certain embodiments of the present disclosure and are therefore not to be considered as limitation on its scope, and that for one of ordinary skill in the art, other related drawings may also be obtained from these drawings without paying out creative efforts.

DETAILED DESCRIPTION

Figure 1:
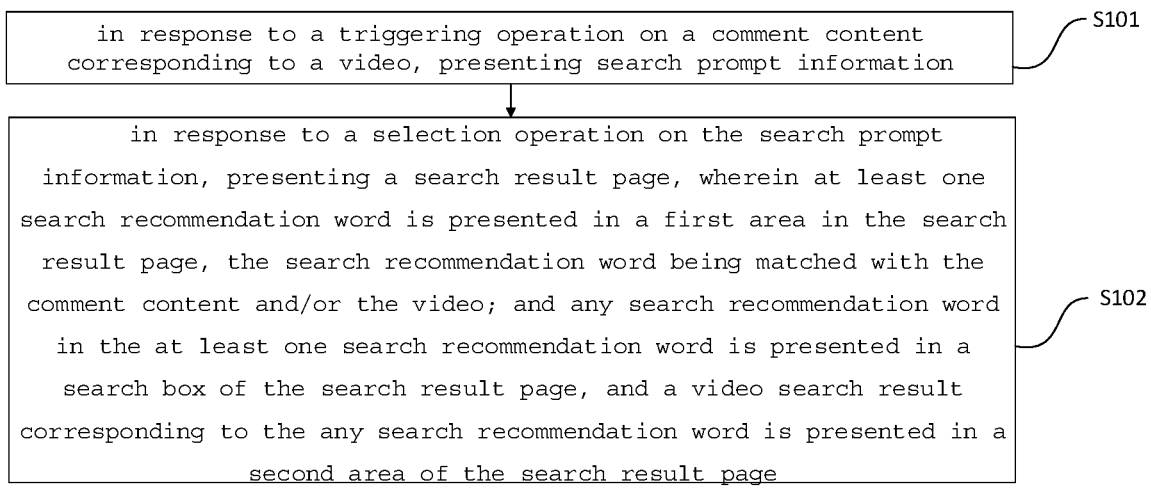
FIG. 1 illustrates a flow diagram of a method of information presentation provided in some embodiments of the present disclosure.

To make the objectives, technical solutions and advantages of the embodiments of the present disclosure more apparent, the technical solutions in the embodiments of the present disclosure will be described clearly and completely with reference to the drawings in the embodiments of the present disclosure, and it is obvious that the described embodiments are only some of the embodiments of the present disclosure, rather than all of the embodiments. Generally, components of the embodiments of the present disclosure that are described and illustrated herein may be arranged and designed in various different configurations. Therefore, the following detailed description of the embodiments of the present disclosure is not intended to limit the claimed scope of the present disclosure, but merely represents selected embodiments of the present disclosure. All other embodiments, which are obtained by those skilled in the art based on the embodiments of the present disclosure without making any creative labor, shall fall within the protection scope of the present disclosure.

When a user acquires information using a terminal application or a website, there might exist some contents not understood by the user; if the user wants to have a detailed understanding of the content, the user needs to exit an information acquisition interface and take the content as a search word for searching, to acquire detailed information of the content, so that the above information acquisition process is cumbersome, time-consuming, and inefficient.

Based on this, the embodiments of the present disclosure provide a method and apparatus of information presentation, and a non-transitory computer storage medium, wherein search prompt information can be presented by triggering a comment content, and a search result page related to the comment content can be directly presented by selecting the search prompt information, without the need of exiting a presentation page for the comment content and then inputting related information in a search page for searching, which improves efficiency of acquiring a search result related to the currently read comment content. In addition, in the search result page, a search recommendation word may be presented, which is matched with the comment content and/or a video, so that a user can further acquire a related video search result by triggering the search recommendation word, thereby further facilitating the user to acquire effective information.

The above defects in the solutions all are results obtained by the inventors after practice and careful study, and therefore, the process of discovering the above problems and the solutions proposed by the present disclosure hereinafter for the above problems should all be contributions made by the inventors to the present disclosure in this disclosed process.

It should be noted that: similar reference numbers and letters refer to similar items in the following accompanying drawings, and therefore, once a certain item is defined in one accompanying drawing, it need not be further defined or explained in subsequent accompanying drawings.

To facilitate understanding of this embodiment, a detailed description is first made to a method of information presentation disclosed in some embodiments of the present disclosure; an execution subject of the method of information presentation provided in the embodiment of the present disclosure is generally a computer device with certain computing power, the computer device comprising, for example: a terminal device, or a server, or other processing devices, wherein the terminal device may be a user equipment (UE), a mobile device, a user terminal, a terminal, a cellular phone, a cordless phone, a personal digital assistant (PDA), a handheld device, a computing device, a vehicle-mounted device, a wearable device, etc. In some possible implementations, the method of information presentation may be implemented by a processor calling computer-readable instructions stored in a memory.

It should be noted that the method of information presentation provided in the embodiment of the present disclosure may be applied to various information search scenarios, comprising, for example: a search scenario for image and text media contents, a search scenario for comment contents corresponding to image and text media contents, a search scenario for comment contents corresponding to a video media content, a search scenario for comment contents corresponding to an audio media content, and the like. In the embodiment of the present disclosure, the method of information presentation provided in the embodiment of the present disclosure is described by taking an example that the method of information presentation is applied to the search scenario for comment contents corresponding to a video media content.

The method of information presentation provided in the embodiment of the present disclosure is described by taking an example that the execution subject is a terminal device.

Reference is made to FIG. 1, which is a flow diagram of an method of information presentation provided in some embodiments of the present disclosure, the method comprising steps S101 to S102.

In S101, in response to a triggering operation on a comment content corresponding to a video, presenting search prompt information.

The comment content is used for characterizing a comment content posted for the video, and here may comprise a plurality of comment contents corresponding to the video, and each comment content may comprise at least one of a picture, text, or a symbol, wherein the symbol may comprise at least one of an emoticon, a sticker, or the like.

The triggering operation here may be, in a playing page for the video, a triggering operation on any comment content of the comment contents presented in a comment area, or a triggering operation on the comment area; here, the triggering operation may comprise at least one of various operations such as single-click, double-click, or long-press.

The search prompt information here is information used for prompting a user to perform a search operation, and the search prompt information may comprise user operation guidance information and a target search recommendation word, or may comprise only the user operation guidance information; wherein the user operation guidance information may comprise at least one of text, icon, or symbol, for example, "search" text guidance information; the target search recommendation word here characterizes a keyword that is suggested for use when the user is searching, and the target search recommendation word may be a search recommendation word selected from at least one search recommendation word and having a highest matching degree with a target comment content. Here, when the user triggers the comment content in the playing page of the video, the comment content currently triggered by the user may be taken as the target comment content, or it may also be considered as a triggering operation on the whole comment area, and in this case, all the comment contents presented in the comment area of the video are taken as the target comment content; the at least one search recommendation word may comprise: a first search recommendation word matched with a keyword in the target comment content; and/or at least one second search recommendation word not appearing in the target comment content and associated with the video; and/or a third search recommendation word matched with a keyword in a sub-comment content of the target comment content; wherein the sub-comment content of the target comment content is used for characterizing a comment content posted by the user for the target comment content, i.e., a content that the user comments on the target comment content.

Here, the first search recommendation word matching with the keyword may specifically comprise: the first search recommendation and the keyword word being the same, or target entities corresponding to the first search recommendation word and the keyword being the same although there is a difference between their text. For example, when a target comment content is: "Erha is surely the most naughty dog on the net, not one of them", through fuzzy matching, "Husky" describing a same target entity as the "Erha" in the target comment content may be determined as a first search recommendation word.

In an implementation, word segmentation processing may be performed on the target comment content, based on the target comment content, to obtain a plurality of candidate words, and from the plurality of candidate words, an entity word and/or a description word related to the video is determined according to a preset strategy, as the first search recommendation word.

The preset strategy here may be a search recommendation word selection strategy made according to actual needs. For example, a proper noun may be selected from the candidate words as the first search recommendation word, and/or a description word that describes at least one of a video content type or a video feature attribute may be selected as the first search recommendation word. The proper noun is a pre-stored word characterizing a specific object, such as name of a person, place, building, country, organization, and enterprise, and the proper noun is different from a common noun which is a type of people or things, or an abstract concept.

In an implementation, word segmentation processing may be performed on the target comment content by using natural language processing (NLP) technology to obtain a plurality of candidate words; and for each candidate word, it is searched from the pre-stored proper nouns whether a proper noun matched with the candidate word exists, and if the proper noun matched with the candidate word exists, the matched proper noun is taken as the first search recommendation word. In addition, for each candidate word, matching the candidate word with various preset video content types and/or video feature attributes, and a candidate word matched with a specific video content type and/or video feature attribute may be taken as the first search recommendation word. For example, a target comment content presented in a comment area of a certain video related to makeup comprises "this series of makeup products of the brand are all very useful", and in this case, "makeup" matched with the video content type can be taken as one first search recommendation word; and for another example, a target comment content comprises "How elegant the girl wearing this outfit is", and a description word "elegant" matched with the feature attribute can be taken as one first search recommendation word.

Exemplarily, if a target comment content presented in a comment area of a video comprises: "Cherry blossoms in Yuyuantan are all blooming, so beautiful", word segmentation processing is performed on the target comment content by using NLP technology to obtain three candidate words "Yuyuantan", "cherry blossoms", and "beautiful"; proper nouns found from pre-stored proper nouns and respectively matched with the two candidate words "Yuyuantan" and "cherry blossoms" are "Yuyuantan park)" and "cherry blossoms", then the "Yuyuantan park)" and "cherry blossoms" are taken as first search recommendation words; for each candidate word, the candidate word may be matched with various preset video content types and/or video feature attributes, and the "beautiful" matched with a specific video content type and/or video feature attribute may also be taken as a first search recommendation word.

In another possible implementation, the first search recommendation word may be selected further in conjunction with interaction data. In other words, from the target comment content, entity words and/or description words related to the video are selected according to a preset strategy, as first candidate search recommendation words, and the first search recommendation word is selected according to interaction data of the first candidate search recommendation words.

Here, the interaction data of the first candidate search recommendation word may comprise: number of searching times that the first candidate search recommendation word is taken as a search word for searching. In an implementation, after a certain number of entity words and/or description words related to the video are selected as the first candidate search recommendation words, according to the number of being-searched times corresponding to each first candidate search recommendation word, a first candidate search recommendation word whose number of being-searched times is greater than a preset searching times threshold is selected as the first search recommendation word.

The interaction data of the first candidate search recommendation words may further comprise various consumption data of each first candidate search recommendation word, for example, number of times of the first candidate search recommendation word being presented within a preset time period, and comments, forwards, and the like of a related media content corresponding to the first candidate search recommendation word; a weight of each type of consumption data may be set, a total consumption value may be calculated based on a data amount and the weight of each type of consumption data, and from the first candidate search recommendation words, a first candidate search recommendation word whose corresponding consumption value is greater than a set threshold or ranked top may be selected as the first search recommendation word.

As mentioned in the above, the search prompt information may comprise the target search recommendation word in addition to the user operation guidance information, so that after the search prompt information is selected, a video search result related to the target search recommendation word in the search prompt information may be presented in a presented search result page, which may improve information search efficiency. Based on this, the target search recommendation word appearing in the search prompt information may have a highest matching degree with the target comment content. That is, after the at least one first search recommendation word in the target comment content is determined, a matching degree between each first search recommendation word and the target comment content may be calculated, and a first search recommendation word having a highest matching degree with the target comment content is selected as the target recommendation word.

In order to better meet the user needs, the above search recommendation words can be expanded to a certain extent; as mentioned in the above description, at least one second search recommendation word not appearing in the target comment content and associated with the video may also be determined, and in this case, the target recommendation word may also be determined from the at least one second search recommendation word; specifically, a second search recommendation word having a greatest matching degree with the target comment content may be taken as the target recommendation word.

Here, the second search recommendation word may be determined according to the following steps: determining the second search recommendation word according to search data input after the video is browsed, and/or feature text corresponding to the video.

The feature text corresponding to the video is also a text content describing the video content. Here, the video content may be parsed by using the NLP technology, to extract the second search recommendation word therefrom.

When the second search recommendation word is determined according to the search data input after the video is browsed, specifically, a search word (i.e., a search word inputted when the user initiates a search (i.e., after-viewing search) after viewing the video) inputted when the user makes search after browsing the video may be taken as the second search recommendation word.

In addition, the target recommendation word may be determined from at least one third search recommendation word matched with keywords in a sub-comment content of the target comment content, and a specific manner thereof is similar to the above manner of determining the target recommendation word in the target comment content, which is not repeated here.

In an implementation, when the user browses the video, after a function entry to present the comment content is triggered, the terminal device, in response to the triggering operation of the user on the function entry to present the comment content, acquires the comment content corresponding to the video, and presents a page comprising the comment content in a form of a floating layer in the playing page of the video; or jumps from the playing page of the video to a presentation page comprising the comment content, so that the comment content corresponding to the video is presented to the user.

Figure 2:
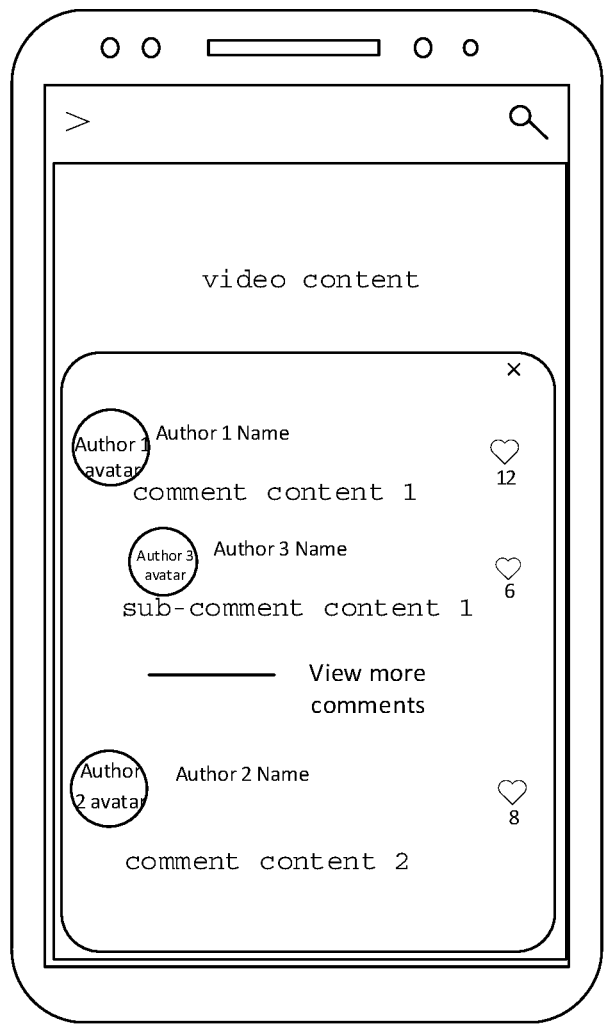
FIG. 2 illustrates a schematic diagram of a specific presentation page comprising a comment content, in a method of information presentation provided in some embodiments of the present disclosure.

Exemplarily, in a playing page of a video, a comment area is presented in a form of a floating layer, and the comment area comprises a comment content, as shown in FIG. 2, where a comment content 1, a comment content 2, and a plurality of sub-comment contents corresponding to the comment content 1 are presented in the comment area.

Figure 3:
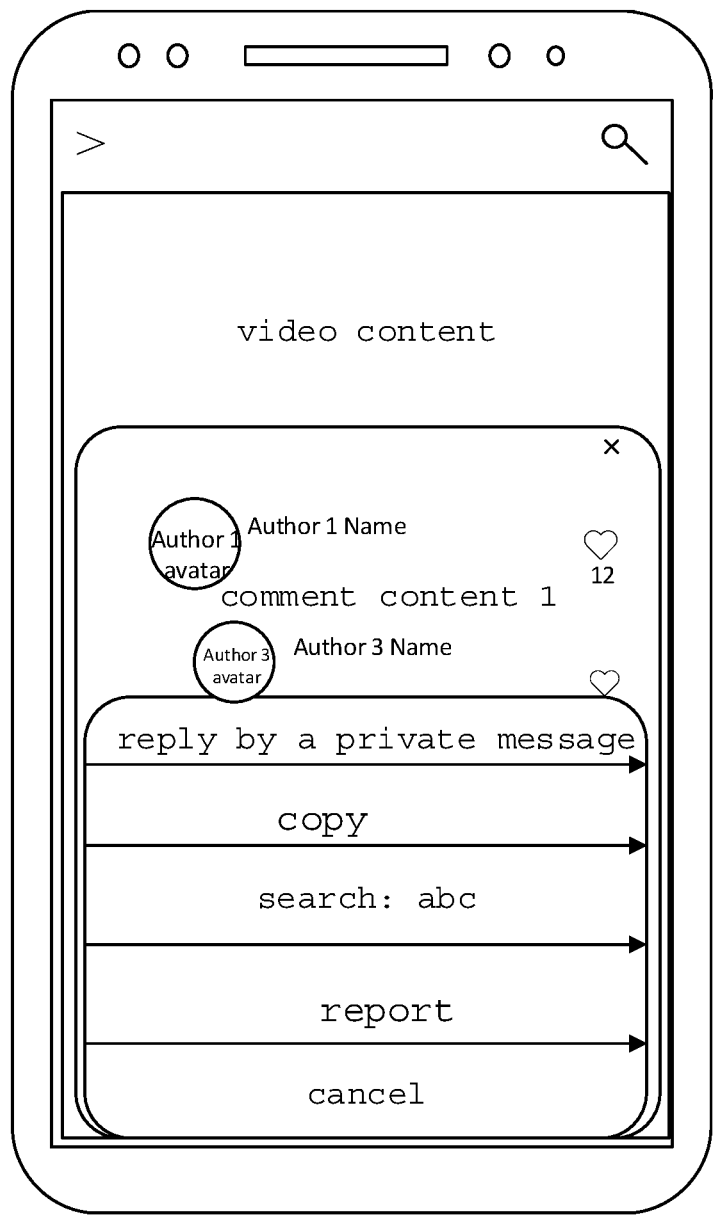
FIG. 3 illustrates a schematic diagram of a specific presentation page comprising search prompt information of a target recommendation word, in a method of information presentation provided in some embodiments of the present disclosure.

As shown in FIG. 2, after a comment presentation button is triggered on the playing page of the video, the comment area may be presented in the form of a floating layer. Then, if a user long-presses the comment area of the video, it is switched to a presentation interface shown in FIG. 3 at this time, wherein a bottom layer of the presentation interface is the playing page of the video, the comment area is presented in a middle floating layer, and related guidance information is presented in an uppermost floating layer, which comprises search prompt information "search: abc", where the "search" is user operation guidance information in the search prompt information, and the "abc" is a target search recommendation word. In addition, other guidance information (for example, reply by a private message, copy, report, cancel, and the like) may also be synchronously presented in the floating layer for presenting the search prompt information.

Figure 4:
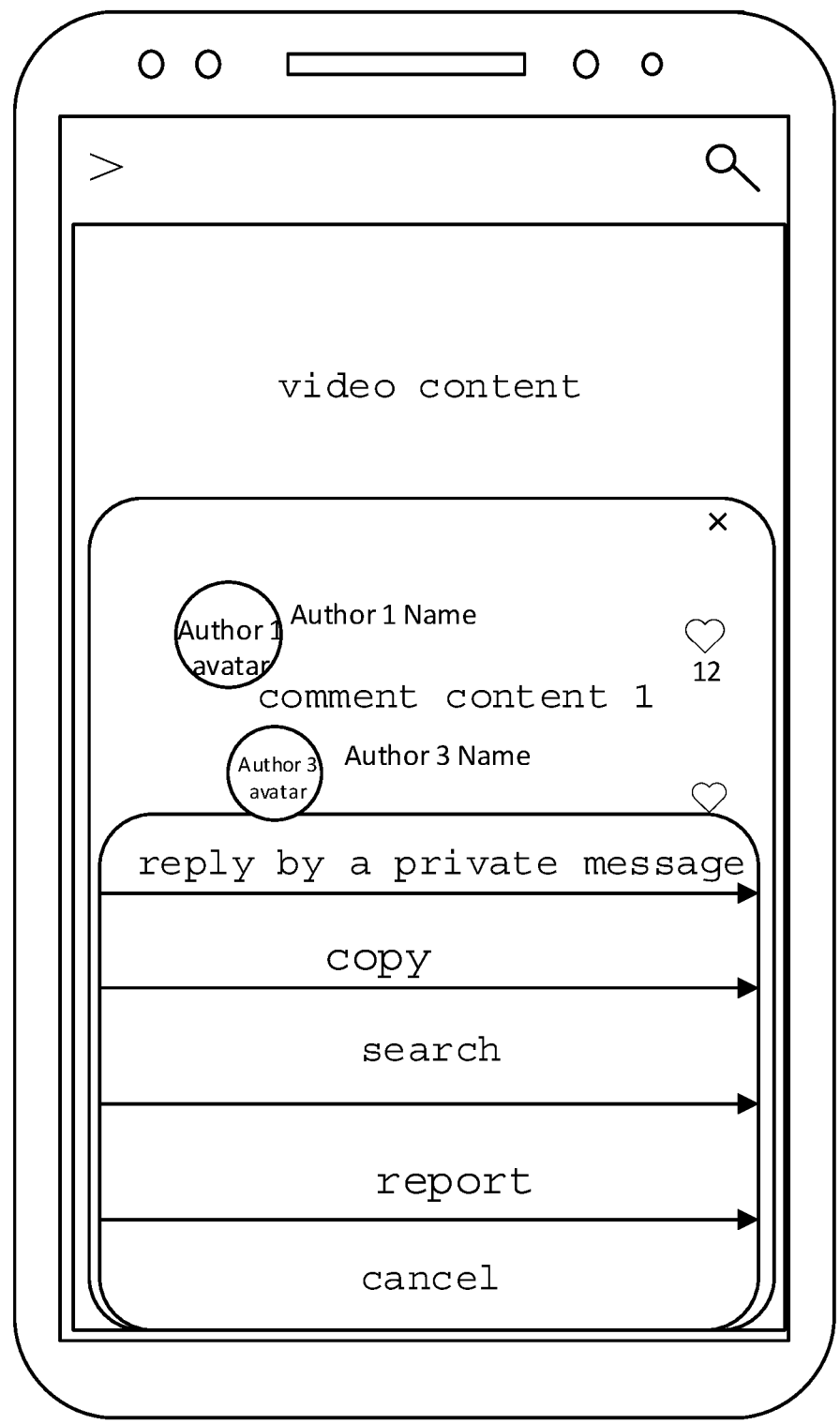
FIG. 4 illustrates a schematic diagram of a specific presentation page not comprising search prompt information of a target recommendation word, in a method of information presentation provided in some embodiments of the present disclosure.

As described above, also in the search prompt information, only the user operation guidance information may be presented, as shown in a presentation interface in FIG. 4, where a bottom layer is a playing page of a video, a comment area is presented in a middle floating layer, and search prompt information "search" is presented in an uppermost floating layer, that is, only the user operation guidance information is presented in the search prompt information in this case.

In an implementation, after the search prompt information is presented to the user, the user may initiate a search by triggering the search prompt information, to acquire a corresponding video search result, and for a specific description thereof, reference is made to S102 below.

S102, in response to a selection operation on the search prompt information, presenting a search result page, wherein at least one search recommendation word is presented in a first area in the search result page, the search recommendation word being matched with the comment content and/or the video; and any search recommendation word in the at least one search recommendation word is presented in a search box of the search result page, and a video search result corresponding to the any search recommendation word is presented in a second area of the search result page.

In an implementation, in the case that the search prompt information comprises the target recommendation word, after the user triggers the search prompt information, the terminal device, in response to the triggering operation of the user for the search prompt information, takes the target recommendation word as a keyword in a search box, initiates a search request carrying the target recommendation word, acquires a video search result matched with the target recommendation word, and presents a search result page corresponding to the video search result; here, the search result page may be presented in a form of a floating layer in the current interface; or it may jump from the playing page of the video to the search result page for presenting the search result matched with the target recommendation word.

According to the method and apparatus of information presentation and the non-transitory computer storage medium provided in the embodiments of the present disclosure, in response to a triggering operation on the comment content corresponding to the video, the search prompt information is presented; and in response to a selection operation on the search prompt information, the search result page is presented; in the embodiments of the present disclosure, the search prompt information can be presented by triggering the comment content, and the search result page related to the comment content can be directly presented by selecting the search prompt information, without the need of exiting the presentation page for the comment content and then inputting related information in a search page for searching, which improves efficiency of searching the information related to the current comment content.

In addition, in the search result page, the search recommendation word can be further presented, which is matched with the comment content and/or the video, so that a user can further acquire the related video search result by triggering the search recommendation word, thereby further facilitating the user to acquire effective information.

Regarding the description of the effects of the above apparatus of information presentation, the computer device, and the computer-readable storage medium, reference is made to the description of the above method of information representation, which is not repeated here.

Figure 5:
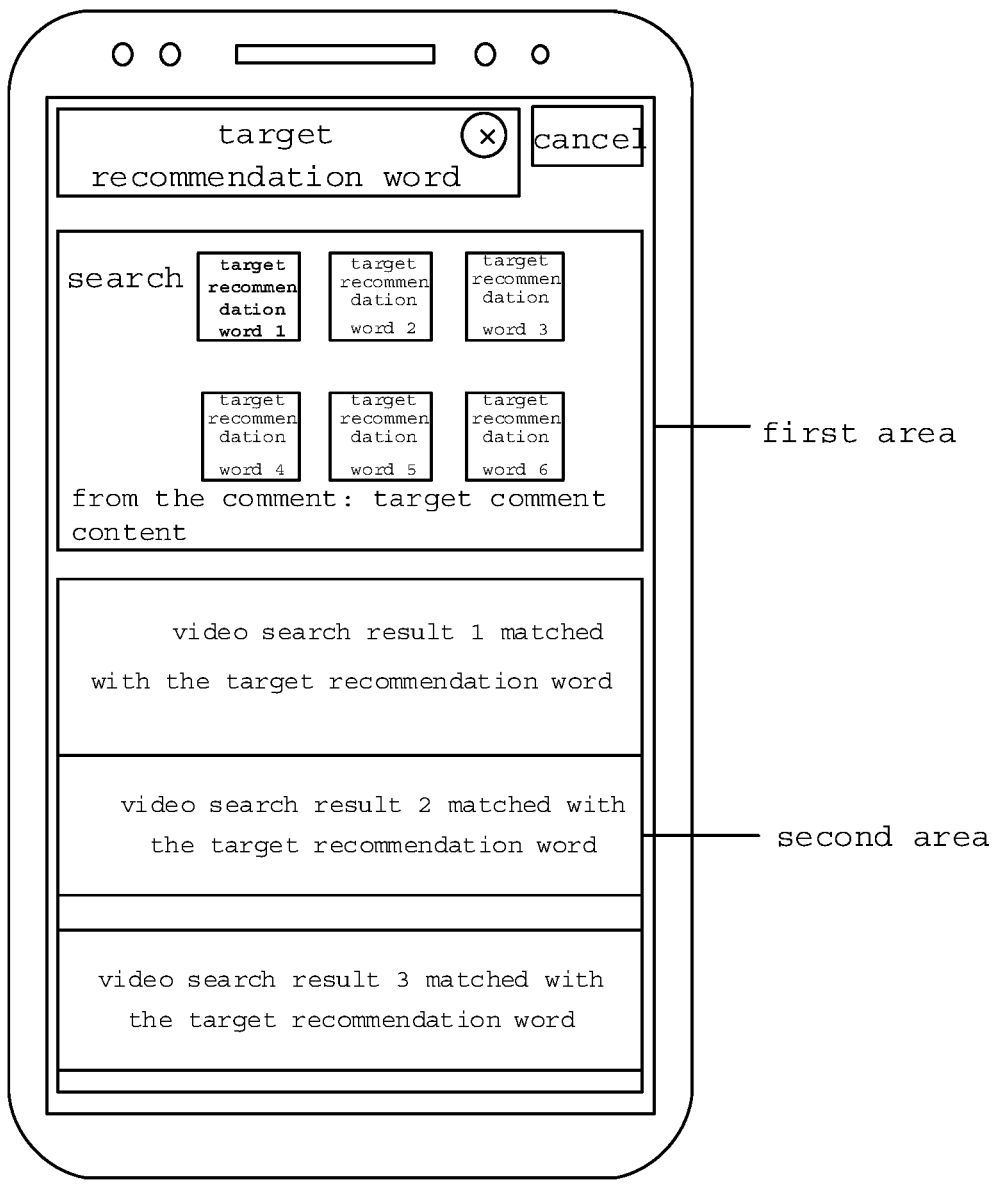
FIG. 5 illustrates a schematic diagram of a presentation page where a plurality of search recommendation words are presented in a first area and a plurality of video search results are presented in a second area, in a method of information presentation provided in some embodiments of the present disclosure.

As shown in FIG. 5, a target recommendation word is presented in a search box of a search result page; at least one target comment content and at least one search recommendation word in a comment content are presented in a first area in the search result page; and a video search result matched with the target recommendation word is presented in a second area of the search result page.

Figure 6:
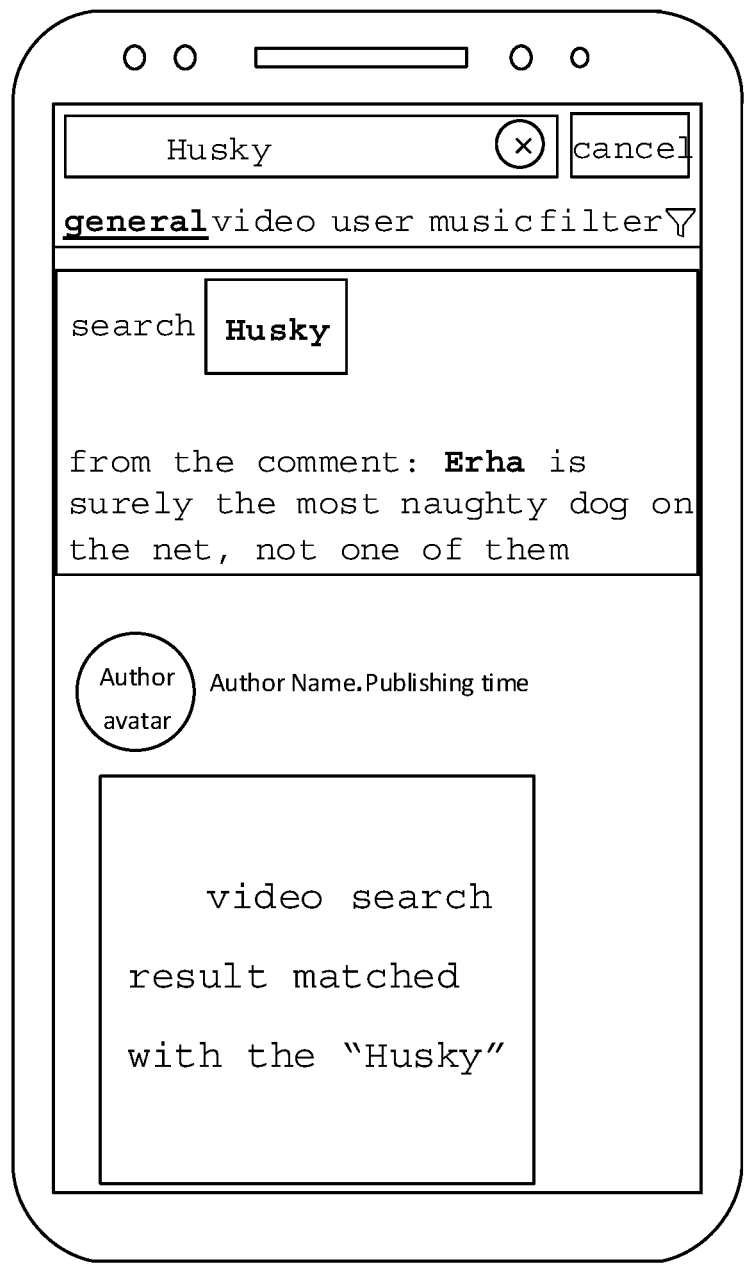
FIG. 6 illustrates a schematic diagram of a presentation page where a search recommendation word obtained by fuzzy matching with a keyword in a target comment content and corresponding to a same entity is presented, in a method of information presentation provided in some embodiments of the present disclosure.

In one implementation, at least one target comment content in the comment content and at least one first search recommendation word matched with keywords in the target comment content may be presented in the above first area. Here, target entities described by the first search recommendation word and the keyword matched with the first search recommendation word are same, for example, the first search recommendation word may be a word the same as a keyword in the target comment content, and the first search recommendation word may also be a word obtained by fuzzy matching with a keyword in the target comment content and corresponding to a same entity. As shown in FIG. 6, the target comment content is "Erha is surely the most naughty dog on the net, not one of them"; and in this case, "Husky" describing the same target entity as "Erha" in the target comment content may be taken as the first search recommendation word.

In addition to the above first search recommendation word, in the above first area, at least one second search recommendation word not appearing in the target comment content and associated with the video may be further presented, and for a process of determining the second search recommendation word, reference is specifically made to the description of the search recommendation word in the above S101, which is not repeated here. Moreover, for the target comment content, there might also be a sub-comment content evaluating the target comment content, so that a third search recommendation word matched with keywords in the sub-comment content may be further presented in the above first area, and for a process of determining the third search recommendation word, reference is specifically made to the description of the search recommendation word in the above S101, which is not repeated here.

Figure 7:
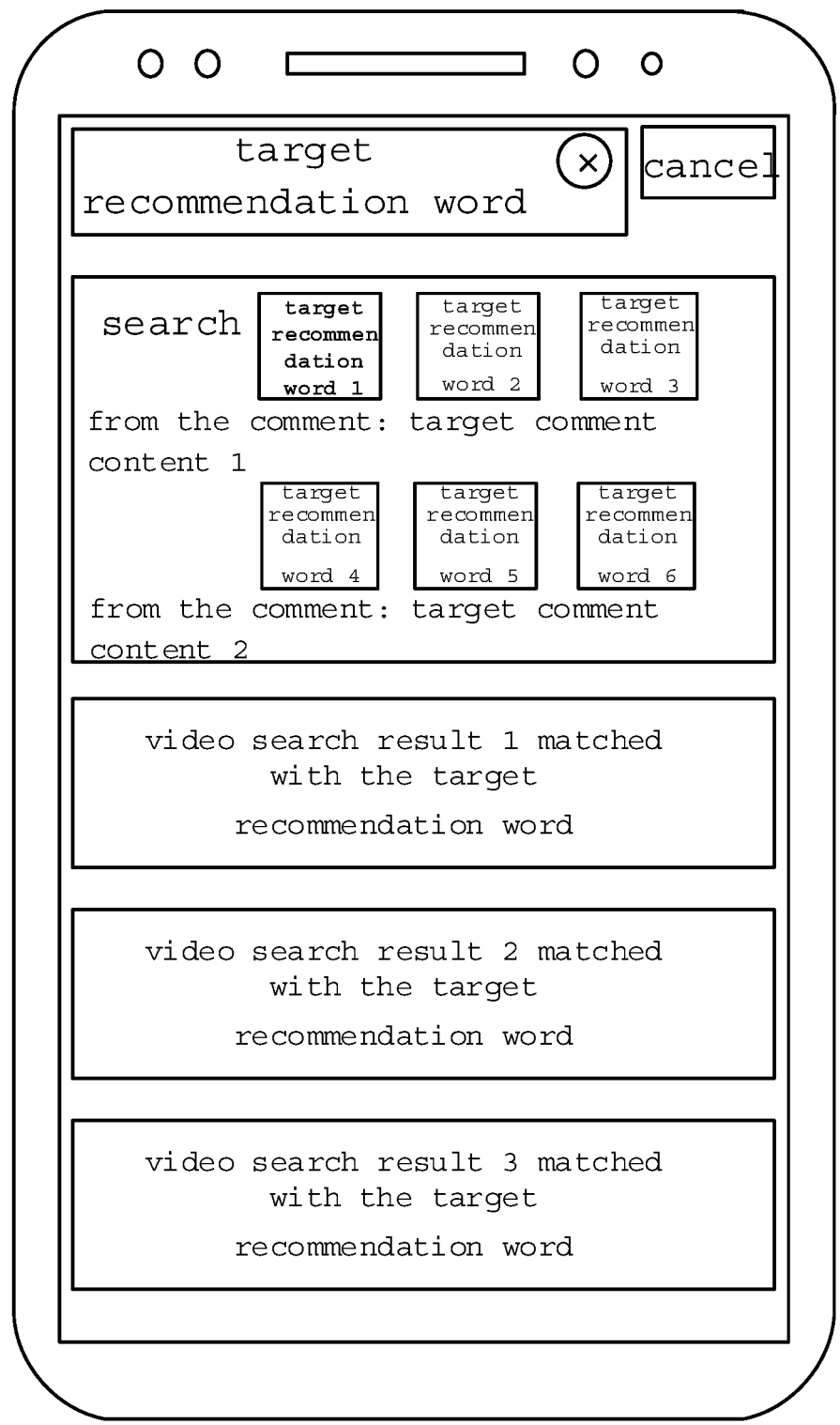
FIG. 7 illustrates a schematic diagram of a presentation page where a plurality of search recommendation words and a plurality of comment contents are presented in a first area and a plurality of video search results are presented in a second area, in a method of information presentation provided in some embodiments of the present disclosure.

In the above implementation, there might comprise a plurality of target comment contents, and in this case, in the first area in the search result page, the plurality of target comment contents may be presented, and the first search recommendation word matched with keywords in each target comment content is presented; and it should be noted that, in the first area of the search result page, each comment content along with its corresponding search recommendation word may be taken as one Search module, and each search module corresponding to each comment content may be respectively presented; or, search recommendation words corresponding to the comment contents may also be put together for presentation, and all the comment contents are put together for presentation. As shown in FIG. 7, each target comment content is separately presented in FIG. 7, and by taking a search recommendation word corresponding to each target comment content as one Search module, the Search module corresponding to each target comment content is separately presented.

Figure 8:
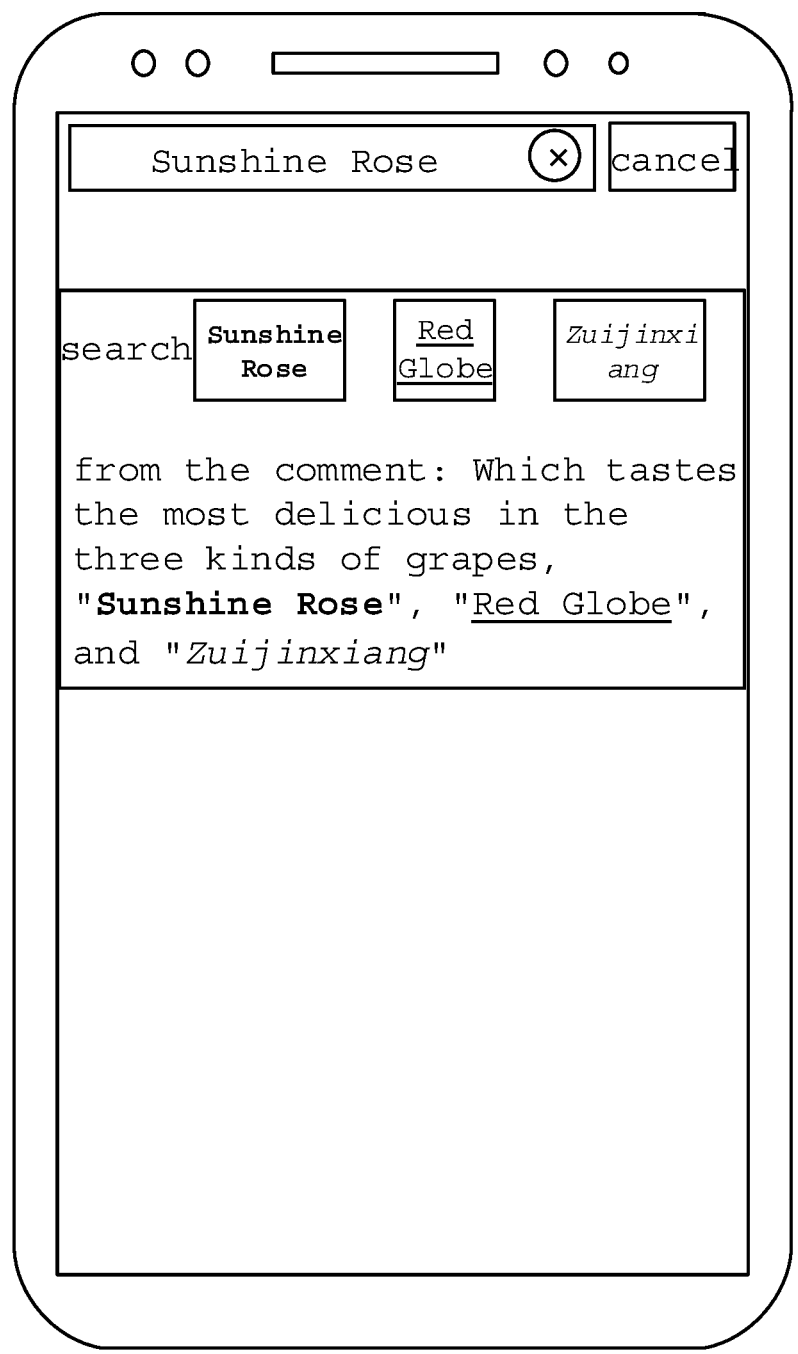
FIG. 8 illustrates a schematic diagram of a presentation page where highlighted presentation is performed on a plurality of search recommendation words and keywords matched in the search recommendation words in target comment content associatively, in a method of information presentation provided in some embodiments of the present disclosure.

Here, highlighted presentation may be performed on the at least one first search recommendation word presented in the first area in the search result page and the keyword matched with the first search recommendation word in the target comment content associatively. When there are a plurality of keywords highlighted presented associatively, the plurality of keywords can be respectively presented in different highlighted presentation manners, as shown in FIG. 8, where association presentation is performed on "sunshine Rose" in a target comment content and a search recommendation word "sunshine Rose" in bold; association presentation is performed on "Red Globe" in the target comment content and a search recommendation word "Red Globe" by underlining; and association presentation is performed on "Zuijinxiang" in the target comment content and a search recommendation word Zuijinxiang" in italics.

As mentioned above, the target recommendation word may be carried in the presented search prompt information, and the video search result corresponding to the target recommendation word is presented in the search result page after the search is initiated. In order to highlight the search recommendation word targeted by the current video search result, in the search result page highlighted presentation may be only performed on the target recommendation word in the search prompt information associatively, that is, highlighted presentation is performed on the target recommendation word in the at least one search recommendation word presented in the first area and the target recommendation word in the target comment content associatively.

Figure 9:
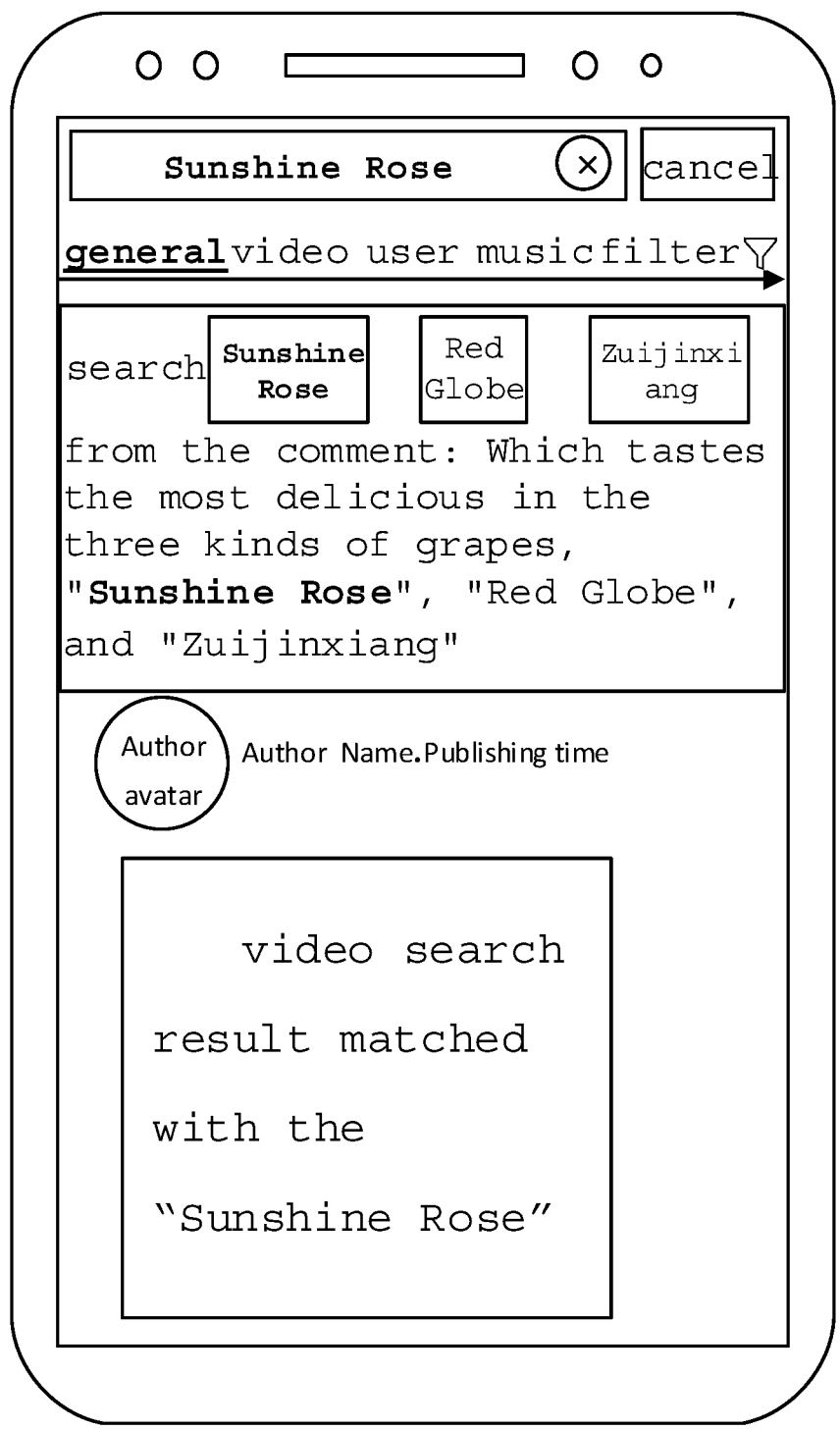
FIG. 9 illustrates a schematic diagram of a specific presentation page of a search result page, in a method of information presentation provided in some embodiments of the present disclosure.

Exemplarily, if a target comment content is: which tastes the most delicious in the three kinds of grapes, "Sunshine Rose", "Red Globe", and "Zuijinxiang"; the target recommendation word determined based on the above S101 is "Sunshine Rose", and after a user triggers search prompt information "search: Sunshine Rose", a terminal device, in response to a triggering operation of the user for the search prompt information, taking the "Sunshine Rose" as a search word, initiates a search request carrying the "Sunshine Rose", acquires a video search result matched with the "Sunshine Rose", and presents a search result page corresponding to the video search result; a specific search result page may be as shown in FIG. 9, where the search result page comprises: a search box comprising the "Sunshine Rose", a search touch button for instructing the user to perform a search operation, a plurality of video presentation dimension identifications (in FIG. 9, a plurality of presentation dimension identifications may be comprised, such as general, video, user, and music, and here highlighted display may be performed on a default selected presentation dimension identification "general" by bolding and underlining), and the target comment content: which tastes the most delicious in the three kinds of grapes, "Sunshine Rose", "Red Globe", and "Zuijinxiang", the target recommendation word "Sunshine Rose", and other first search recommendation words "Red Globe", and "Zuijinxiang" than the target recommendation word in the target comment content, located in a first area of the search result page, and a video search result located in a second area of the search result page and matched with the "Sunshine Rose"; here, in FIG. 9, highlighted presentation is performed on the target recommendation word "Sunshine Rose" presented in the first area of the search result page and the keyword "Sunshine Rose" matched with the target recommendation word associatively in the target comment content by bolding.

In an implementation, after the above search recommendation word (the first search recommendation word/second search recommendation word/third search recommendation word) is presented in the first area of the search result page and the video search result corresponding to any search recommendation word (hereinafter referred to as a search recommendation word A) is presented in the second area, if the user triggers a search request with another search recommendation word B other than the search recommendation word A, the search recommendation word A presented in the search box of the search result page can be switched to the search recommendation word B triggered by the user; and based on the search recommendation word B, a search request is initiated, a video search result matched with the search recommendation word B is acquired, and the video search result presented in the second area of the search result page and matched with the search recommendation word A is replaced with a video search result matched with the search recommendation word B, thereby refreshing the video search result. Continued from the above, when highlighted presentation is, in the search result page, only performed on the search recommendation word associated with the video search result, after the video search result is refreshed, the search recommendation word subjected to the highlighted presentation is also switched from the search recommendation word A to the search recommendation word B.

Figure 10:
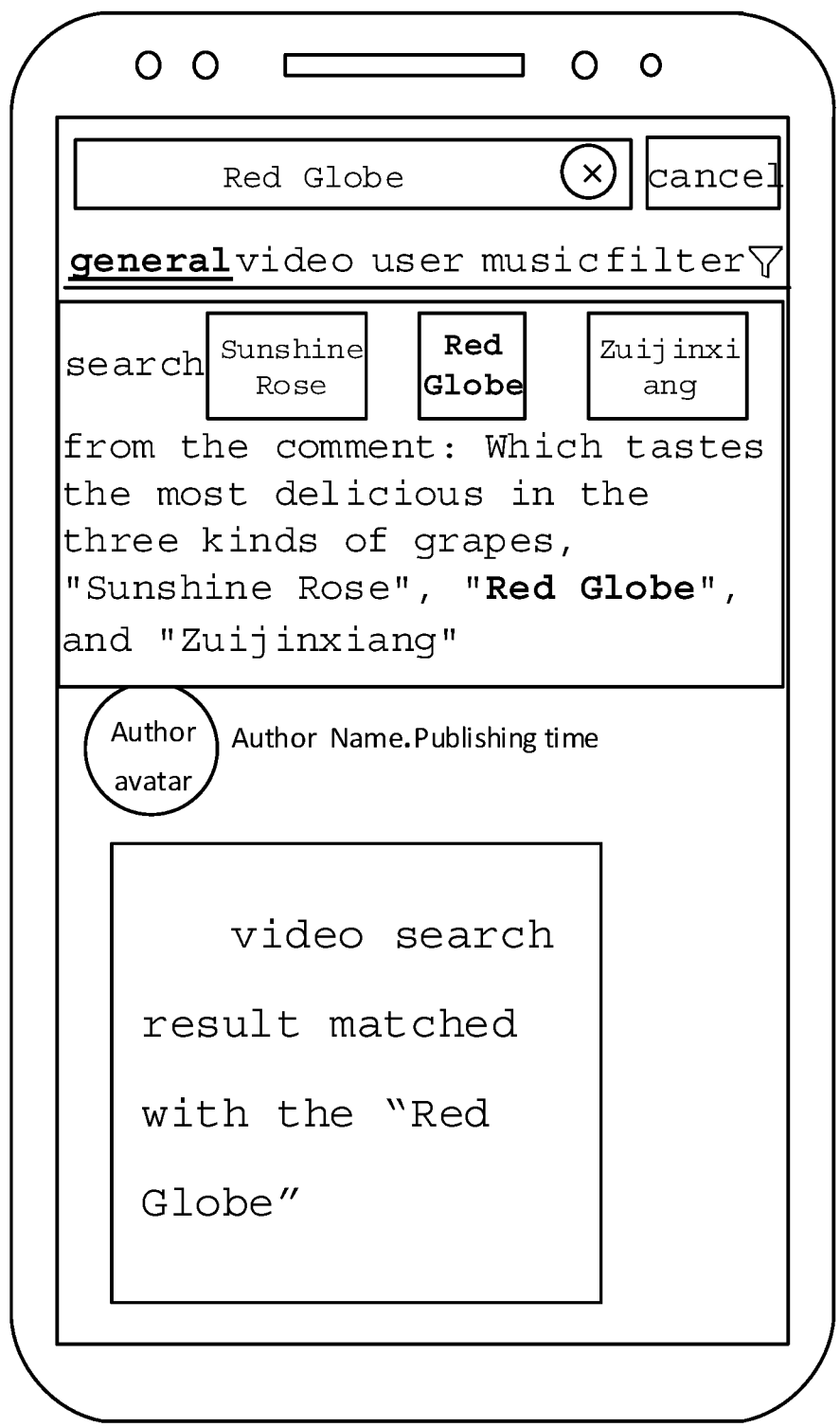
FIG. 10 illustrates a schematic diagram of another specific presentation page of a search result page, in a method of information presentation provided in some embodiments of the present disclosure.

Exemplarily, after a search recommendation word "Red Globe" in FIG. 10 is triggered, "Sunshine Rose" in a search box is replaced with the "Red Globe", a search request carrying the "Red Globe" is initiated, and a video search result matched with the "Red Globe" is acquired; and a video search result matched with the "Sunshine Rose" currently presented in a second area of a search result page is replaced with the acquired video search result matched with the "Red Globe", and a specific presentation page may be as shown in FIG. 10.

Here, when the user triggers a cancel touch button in FIG. 10 for instructing the user to perform a search cancel operation, or after the user makes a preset gesture on a screen, it may be returned to a presentation page for the comment content corresponding to the video and located to a comment content browsed by the user last time, and a specific presentation page for the comment content corresponding to the video may be as shown in FIG. 2. The preset gesture here may comprise a gesture set as needed and capable of triggering a return operation, such as a leftward-swiping gesture.

Figure 11:
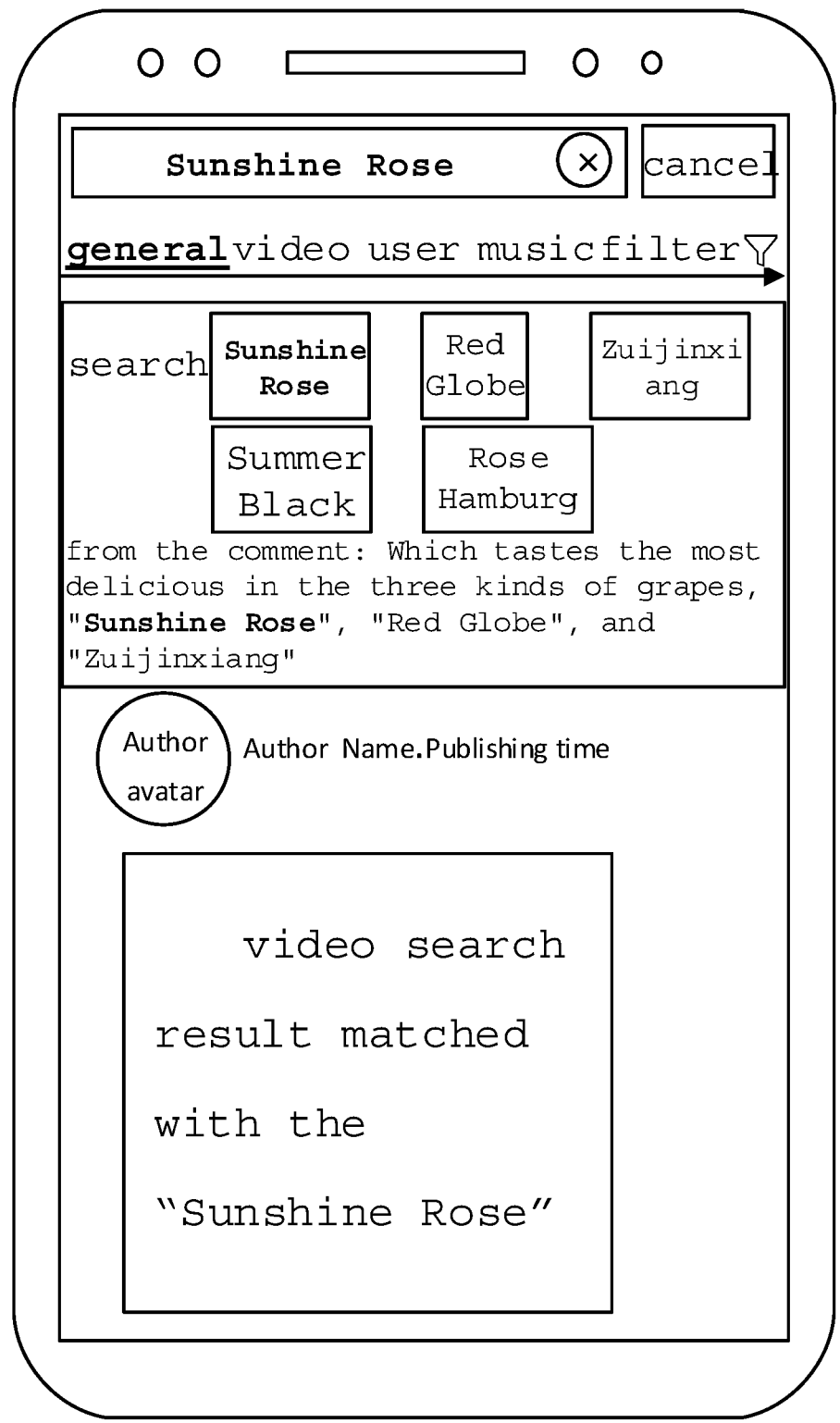
FIG. 11 illustrates a schematic diagram of still another specific presentation page of a search result page, in a method of information presentation provided in some embodiments of the present disclosure.

In some embodiments, the at least one second search recommendation word not appearing in the target comment content and associated with the video may further be presented in the first area of the search result page; exemplarily, if a target comment content is: which tastes the most delicious in the three kinds of grapes, "Sunshine Rose", "Red Globe", and "Zuijinxiang"; first search recommendation words determined based on the above S101 and matched with keywords in the target comment content comprise: "Sunshine Rose", "Red Globe", and "Zuijinxiang"; determined at least one second search recommendation words not appearing in the target comment content and associated with the video comprise: "Summer Black" and "Rose Hamburg", and if a target recommendation word is determined as the "Sunshine Rose", a specific search result page may be as shown in FIG. 11, comprising: a search box comprising the "Sunshine Rose", and the target comment content: which tastes the most delicious in the three kinds of grapes, "Sunshine Rose", "Red Globe", and "Zuijinxiang", the target recommendation word "Sunshine Rose", other first search recommendation words "Red Globe", and "Zuijinxiang" than the target recommendation word in the target comment content, and the second search recommendation words "Summer Black" and "Rose Hamburg" not appearing in the target comment content and associated with the video that are presented in a first area of the search result page, and a video search result presented in a second area of the search result page and matched with the "Sunshine Rose".

In some embodiments, a sub-comment content of the target comment content and at least one third search recommendation word matched with the keywords in the sub-comment content may further be presented in a first result presentation area of the search result page.

It should be noted that, in the first area of the search result page, each comment content along with its corresponding search recommendation word may be taken as one Search module, and the Search module corresponding to each comment content may be respectively presented, or, the search recommendation words corresponding to the comment contents may be put together for presentation, and the comment contents are put together for presentation.

Figure 12:
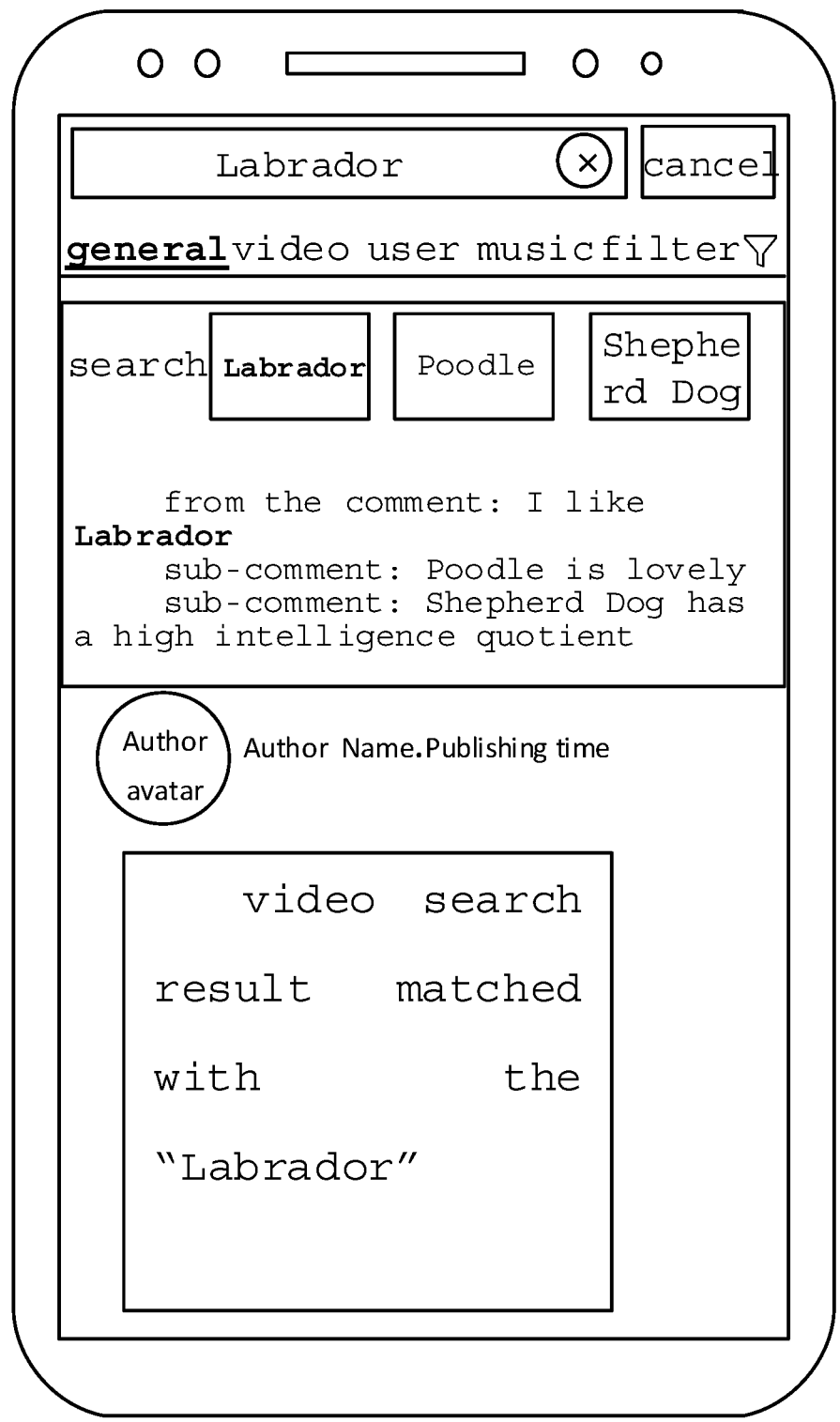
FIG. 12 illustrates a schematic diagram of a further specific presentation page of a search result page, in a method of information presentation provided in some embodiments of the present disclosure.

Exemplarily, if a target comment content is: I like Labrador best; and corresponding sub-comment contents comprise: "Poodle is lovely", and "Shepherd Dog has a high intelligence quotient"; then, in a first area of a search result page, the target comment content "I like Labrador best" and the two sub-comment contents "Poodle is lovely", and "Shepherd Dog has a high intelligence quotient" corresponding to the target comment content may be presented; and search recommendation words matched with keywords in the comment contents, namely "Labrador", "Poodle", and "Shepherd Dog", are presented; if a target recommendation word is the "Labrador", a video search result matched with the target recommendation word "Labrador" may be presented in a second area of the search result page, and a specific presentation page may be as shown in FIG. 12.

In an implementation, the number of search recommendation words can be presented in the first area in the search result page and the number of characters can be presented in each search recommendation word can be determined according to a screen size and a presentation size of a preset character; here, if the number of characters comprised in the determined search recommendation word is greater than the number of characters that may be presented determined above, excess characters may be replaced by a default folding identifier; and the default folding identifier may comprise a symbol, such as ". . . ".

Figure 13:
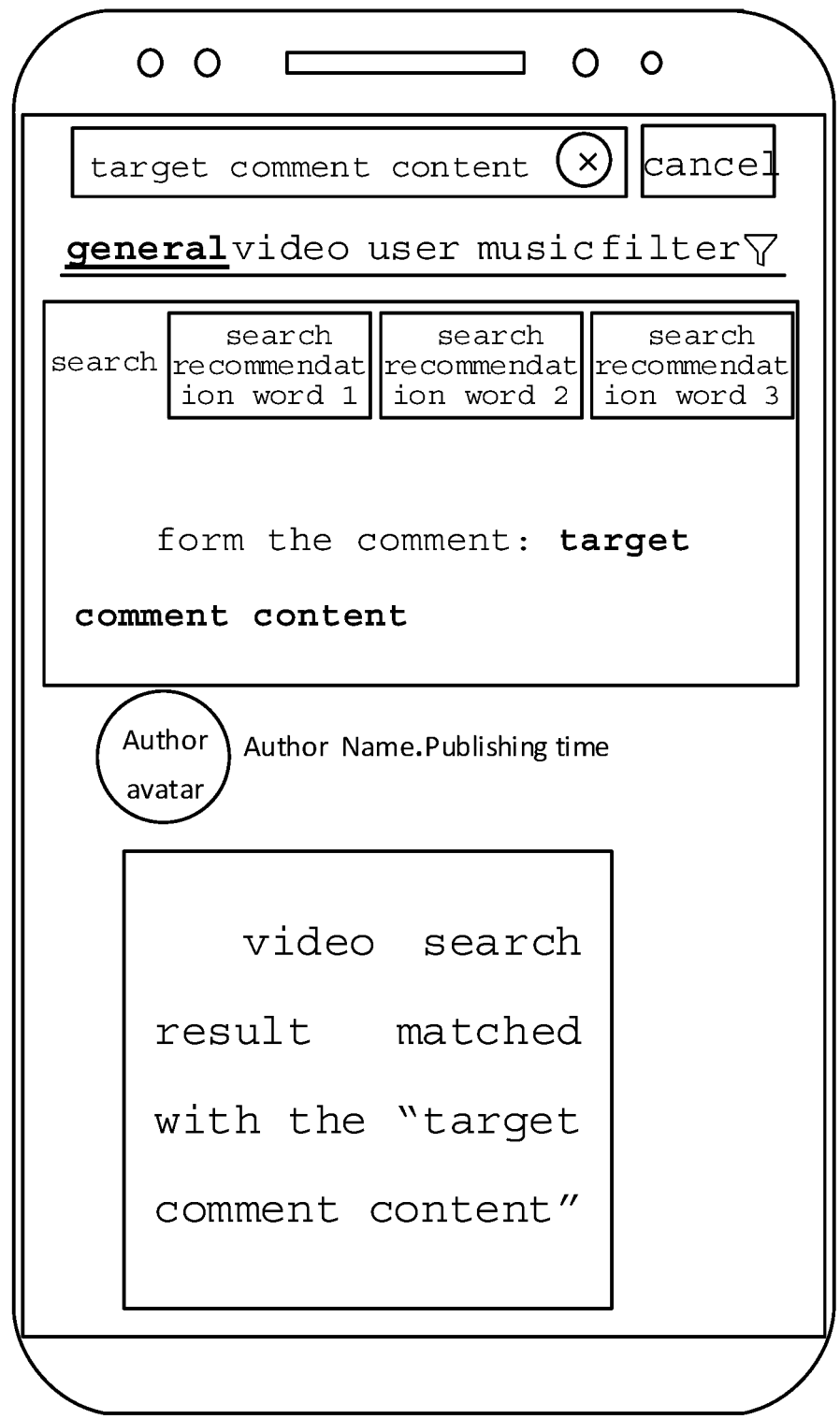
FIG. 13 illustrates a schematic diagram of a further specific presentation page of a search result page, in a method of information presentation provided in some embodiments of the present disclosure.

In some embodiments, a search may be initiated further for the whole target comment content; for example, after at least one target comment content is presented in the above first area, if one target comment content thereof is selected, a search may be initiated based on the target comment content in this case, a video search result matched with the target comment content is acquired, and the target comment content and a search recommendation word associated with the target comment content are presented in a search box of a search result page; and in a second area of the search result page, the video search result matched with the target comment content is presented, as shown in FIG. 13.

In the embodiments of the present disclosure, in response to the triggering operation on the comment content corresponding to the video, the search prompt information is presented; and in response to the selection operation on the search prompt information, the search result page is presented, so that in the embodiments of the present disclosure, the search prompt information can be presented by triggering the comment content, and the search result page related to the comment content can be directly presented by selecting the search prompt information, without the need of exiting the presentation page for the comment content and then inputting related information in a search page for searching, which improves efficiency of searching the information related to the current comment content.

In addition, in the search result page, the search recommendation word can further be presented, which is matched with the comment content and/or the video, so that the user can further acquire related video search results by triggering the search recommendation word, thereby further facilitating the user to acquire effective information.

It may be understood by those skilled in the art that in the above method of the specific implementation, the order of the steps does not imply a strict execution order and does not impose any limitations on the implementation, and a specific execution order of the steps should be determined by their functions and possible inherent logic.

Based on the same invention concept, embodiments of the present disclosure further provides an apparatus of information presentation corresponding to the method of information presentation, and since the principle of solving the problem of the apparatus in the embodiment of the present disclosure is similar to that of the above method of information presentation in the embodiment of the present disclosure, for the implementation of the apparatus, reference may be made to the implementation of the method, wherein repeated parts are not described again.

Figure 14:
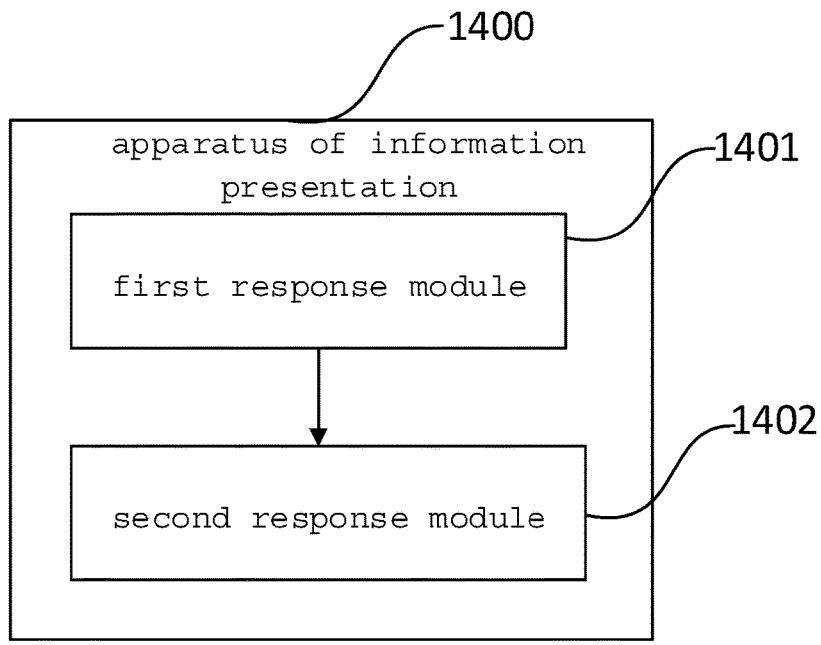
FIG. 14 illustrates a schematic diagram of an apparatus of information presentation provided in some embodiments of the present disclosure.

Reference is made to FIG. 14, which is a schematic diagram of an apparatus 1400 of information presentation provided in some embodiments of the present disclosure, the apparatus comprising:

a first response module 1401, and a second response module 1402, wherein
  the first response module 1401 is configured to, in response to a triggering operation on a comment content corresponding to a video, present search prompt information;
  the second response module 1402 is configured to, in response to a selection operation on the search prompt information, present a search result page, wherein at least one search recommendation word is presented in a first area in the search result page, the search recommendation word being matched with the comment content and/or the video; and any search recommendation word in the at least one search recommendation word is presented in a search box of the search result page, and a video search result corresponding to the any search recommendation word is presented in a second area of the search result page.

In the embodiment of the present disclosure, in response to the triggering operation on the comment content corresponding to the video, the search prompt information is presented; and in response to the selection operation on the search prompt information, the search result page is presented, so that in the embodiment of the present disclosure, the search prompt information can be presented by triggering the comment content, and the search result page related to the comment content can be directly presented by selecting the search prompt information, without the need of exiting the presentation page for the comment content and then inputting related information in a search page for searching, which improves efficiency of searching the information related to the current comment content.

In addition, further in the search result page, the search recommendation word can be presented, which is matched with the comment content and/or the video, so that a user can further acquire related video search results by triggering the search recommendation word, thereby further facilitating the user to acquire effective information.

In some embodiments, there might comprise a plurality of comment contents, at least one target comment content in the comment content and at least one first search recommendation word matched with keywords in the target comment content are presented in the first area.

In some embodiments, at least one second search recommendation word not appearing in the target comment content and associated with the video is further presented in the first area.

In some embodiments, the apparatus further comprises: a display module configured to perform highlighted association display on the at least one first search recommendation word presented in the first area and the keyword matched with the first search recommendation word in the target comment content.

In some embodiments, target entities described by the first search recommendation word and the keyword matched with the first search recommendation word are same.

In some embodiments, the search prompt information comprises a target recommendation word, which is a search recommendation word selected from the at least one search recommendation word and having a highest matching degree with the target comment content.

In some embodiments, the apparatus further comprises: a first determination module configured to select an entity word and/or a description word related to the video according to a preset strategy, from the target comment content, as the first search recommendation word; and/or select entity words and/or description words related to the video according to a preset strategy, from the target comment content, as first candidate search recommendation words, and select the first search recommendation word according to interaction data of the first candidate search recommendation words.

In some embodiments, the apparatus further comprises: a second determination module configured to determine the second search recommendation word according to search data input after the video is browsed and/or feature text corresponding to the video.

In some embodiments, the apparatus further comprises: a third response module configured to, in response to a triggering operation on any other search recommendation word presented in the first area than the any search recommendation word corresponding to the current video search result, switch to present the any other search recommendation word in the search box of the search result page; and switch to present a video search result corresponding to the any other search recommendation word in the second area of the search result page.

For the descriptions of the processing flows of the modules in the apparatus and the interaction flows between the modules, reference may be made to the related descriptions in the above method embodiments, which are not be described in detail here.

Figure 15:
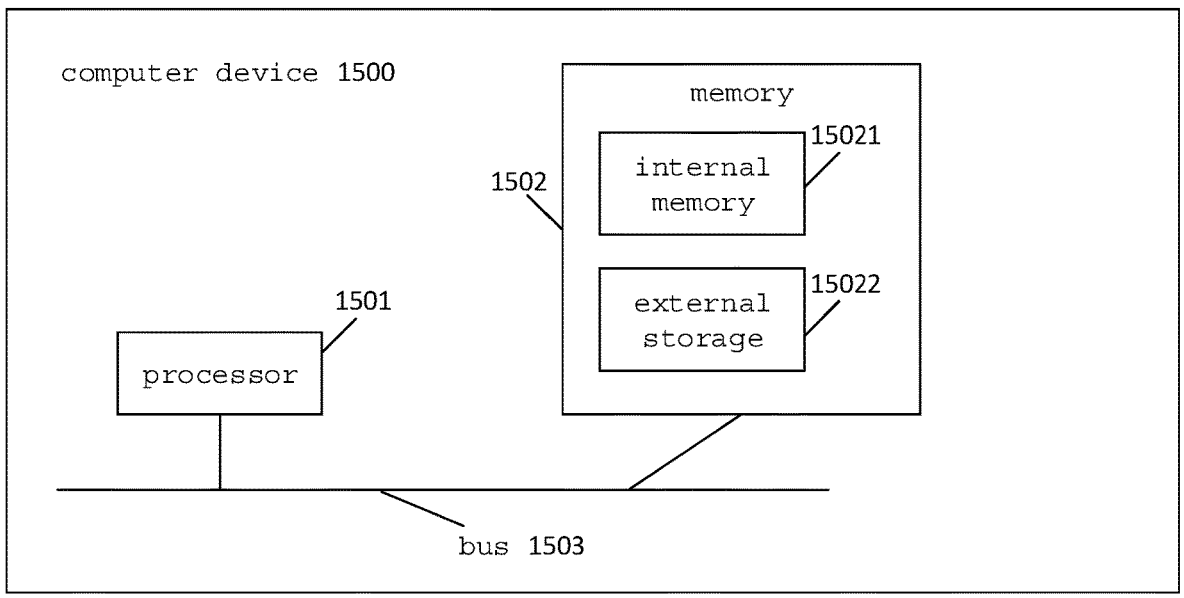
FIG. 15 illustrates a schematic diagram of a computer device provided in some embodiments of the present disclosure.

Based on the same technical concept, an embodiment of the present application further provides a computer device. Reference is made to FIG. 15, which is a schematic structural diagram of a computer device 1500 provided in the embodiment of the present application, comprising a processor 1501, a memory 1502, and a bus 1503. The memory 1502 is configured to store execution instructions and comprises an internal memory 15021 and an external memory 15022; the internal memory 15021 here is also called an internal memory, and is configured to temporarily store operation data in the processor 1501 and data exchanged with the external memory 15022 such as a hard disk, and the processor 1501 exchanges data with the external memory 15022 through the internal memory 15021, and when the computer device 1500 is operating, the processor 1501 communicates with the memory 1502 through the bus 1503, causing the processor 1501 to execute the following instructions: in response to an triggering operation on a comment content corresponding to a video, presenting search prompt information; and in response to a selection operation on the search prompt information, presenting a search result page, wherein at least one search recommendation word is presented in a first area in the search result page, the search recommendation word being matched with the comment content and/or the video; and any search recommendation word in the at least one search recommendation word is presented in a search box of the search result page, and a video search result corresponding to the any search recommendation word is presented in a second area of the search result page.

For a specific processing flow of the processor 1501, reference may be made to the description of the above method embodiment, which is not repeated here.

An embodiment of the present disclosure further provides a computer-readable storage medium having a computer program stored thereon, which, when executed by a processor, performs the steps of the method of information presentation described in the above method embodiment. The storage medium may be a volatile or non-volatile computer-readable storage medium.

An embodiment of the present disclosure further provides a computer program product having program code carried thereon, wherein instructions comprised in the program code may be used for performing the steps of the method of information presentation in the above method embodiment, and reference may be specifically made to the above method embodiment, which is not repeated here.

The above computer program product may be specifically implemented by hardware, software or a combination thereof. In one alternative embodiment, the computer program product is specifically embodied as a computer storage medium, while in another optional embodiment, the computer program product is specifically embodied as a software product, for example, a software development kit (SDK), or the like.

It can be clearly understood by those skilled in the art that, for convenience and simplicity of the description, for the specific working processes of the system and the apparatus described above, reference may be made to the corresponding processes in the foregoing method embodiments, which are not repeated here. In the several embodiments provided in the present disclosure, it should be understood that the disclosed system, apparatus and method may be implemented in other ways. The apparatus embodiment described above is merely illustrative, for example, the division of the units is only a logical function division, and there may be another division in an actual implementation, and for another example, a plurality of units or components may be combined or integrated into another system, or some features may be omitted, or not implemented. On the other hand, the shown or discussed coupling or direct coupling or communication connection between each other may be, through some communication interfaces, indirect coupling or communication connection between devices or units, which may be in an electrical, mechanical or other form.

The units described as separate components may or may not be physically separated, and the components displayed as units may or may not be physical units, that is, they may be located in one position, or may be distributed over a plurality of network units. Some or all of the units can be selected according to actual needs to achieve the purpose of the solutions of the embodiments.

In addition, the functional units in the embodiments of the present disclosure may be integrated into one processing unit, or each unit may exist alone physically, or two or more units are integrated into one unit.

The functions, if implemented in a form of a software function unit and sold or used as a stand-alone product, may be stored in one non-volatile computer-readable storage medium executable by a processor. Based on such understanding, the technical solution of the present disclosure in essence, or a portion contributing to the prior art, or a portion of the technical solution, may be embodied in a form of a software product, which is stored in one storage medium and comprises several instructions for causing one computer device (which may be a personal computer, a server, a network device, or the like) to perform all or part of the steps of the methods according to the embodiments of the present disclosure. The above storage medium comprises: various media that can store program code, such as a USB flash disk, a mobile hard disk, a read-only memory (ROM), a random access memory (RAM), a magnetic disk, or an optical disk.

Finally, it should be noted that: the above embodiments are merely specific implementations of the present disclosure, which are intended to illustrate the technical solutions of the present disclosure, rather than limiting the technical solutions, so that the protection scope of the present disclosure is not limited thereto, and although the present disclosure is described in detail with reference to the foregoing embodiments, those of ordinary skill in the art should understand that: anyone skilled in the art can, within the technical scope disclosed in the present disclosure, still make modifications to the technical solutions described in the foregoing embodiments or readily conceive of changes, or make equivalent substitutions for partial technical features therein; and such modifications, changes and substitutions do not make the essence of the corresponding technical solutions depart from the spirit and scope of the technical solutions of the embodiments of the present disclosure, and should all be covered within the protection scope of the present disclosure. Therefore, the protection scope of the present disclosure shall be subject to the protection scope of the claims.

What is claimed is:

1. A method of information presentation, comprising:
   presenting search prompt information, in response to a triggering operation on a comment content corresponding to a video, wherein the comment content comprises a plurality of comment contents; and
   presenting a search result page, in response to a selection operation on the search prompt information, wherein at least one search recommendation word is presented in a first area in the search result page, the at least one search recommendation word is matched with at least one of the comment content or the video, any search recommendation word in the at least one search recommendation word is presented in a search box of the search result page, a video search result corresponding to the any search recommendation word is presented in a second area of the search result page, and at least one target comment content in the comment content is presented in the first area, and at least one first search recommendation word matched with a keyword in the at least one target comment content is presented in the first area.

2. The method of information presentation according to claim 1, wherein at least one second search recommendation word not appearing in the at least one target comment content and associated with the video is further presented in the first area.

3. The method of information presentation according to claim 1, further comprising:
performing highlighted display on the at least one first search recommendation word presented in the first area and the keyword matched with the at least one first search recommendation word in the at least one target comment content associatively.

4. The method of information presentation according to claim 1, wherein target entities described by the at least one first search recommendation word and the keyword matched with the at least one first search recommendation word are same.

5. The method of information presentation according to claim 1, wherein the search prompt information comprises a target recommendation word, which is a search recommendation word selected from the at least one search recommendation word and having a highest matching degree with the at least one target comment content.

6. The method of information presentation according to claim 1, further comprising:
determining the first search recommendation according to at least one of following steps:
selecting at least one of an entity word or a description word related to the video according to a preset strategy, based on the at least one target comment content, as the at least one first search recommendation word; or
selecting at least one of entity words or description words related to the video according to a preset strategy, based on the at least one target comment content, as first candidate search recommendation words, and selecting the at least one first search recommendation word according to interaction data of each of the first candidate search recommendation words.

7. The method of information presentation according to claim 2, further comprising:
determining the at least one second search recommendation word according to at least one of search data input after the video is browsed or a feature text corresponding to the video.

8. The method of information presentation according to claim 1, further comprising:
switching to present any other search recommendation word presented in the first area than the any search recommendation word corresponding to a current video search result in the search box of the search result page, in response to a triggering operation on the any other search recommendation word; and
switching to present a video search result corresponding to the any other search recommendation word in the second area of the search result page.

9. A non-transitory computer-readable storage medium, wherein the computer-readable storage medium has a computer program stored thereon, which, when executed by a computer device, the computer device performing a method of information presentation, comprising:
presenting search prompt information, in response to a triggering operation on a comment content corresponding to a video, wherein the comment content comprises a plurality of comment contents; and
presenting a search result page, in response to a selection operation on the search prompt information, wherein at least one search recommendation word is presented in a first area in the search result page, the at least one search recommendation word is matched with at least one of the comment content or the video, any search recommendation word in the at least one search recommendation word is presented in a search box of the search result page, a video search result corresponding to the any search recommendation word is presented in a second area of the search result page, and at least one target comment content in the comment content is presented in the first area, and at least one first search recommendation word matched with a keyword in the at least one target comment content is presented in the first area.

10. A computer device, comprising: a processor, and a memory, the memory having therein stored machine-readable instructions executable by the processor, the processor being configured to execute the machine-readable instructions stored in the memory, and when the machine-readable instructions are executed by the processor, the processor performing a method of information presentation, comprising:
presenting search prompt information, in response to a triggering operation on a comment content corresponding to a video, wherein the comment content comprises a plurality of comment contents; and
presenting a search result page, in response to a selection operation on the search prompt information, wherein at least one search recommendation word is presented in a first area in the search result page, the at least one search recommendation word is matched with at least one of the comment content or the video, any search recommendation word in the at least one search recommendation word is presented in a search box of the search result page, a video search result corresponding to the any search recommendation word is presented in a second area of the search result page, and at least one target comment content in the comment content is presented in the first area, and at least one first search recommendation word matched with a keyword in the at least one target comment content is presented in the first area.

11. The computer device according to claim 10, wherein at least one second search recommendation word not appearing in the at least one target comment content and associated with the video is further presented in the first area.

12. The computer device according to claim 10, wherein the processor performs a step of:
performing highlighted display on the at least one first search recommendation word presented in the first area and the keyword matched with the at least one first search recommendation word in the at least one target comment content associatively.

13. The computer device according to claim 10, wherein target entities described by the at least one first search recommendation word and the keyword matched with the at least one first search recommendation word are same.

14. The computer device according to claim 10, wherein the search prompt information comprises a target recommendation word, which is a search recommendation word selected from the at least one search recommendation word and having a highest matching degree with the at least one target comment content.

15. The computer device according to claim 10, wherein the processor performs steps of:

determining the first search recommendation according to at least one of following steps:

selecting at least one of an entity word or a description word related to the video according to a preset strategy, based on the at least one target comment content, as the at least one first search recommendation word; or selecting at least one of entity words or description words related to the video according to a preset strategy, based on the at least one target comment content, as first candidate search recommendation words, and selecting the at least one first search recommendation word according to interaction data of each of the first candidate search recommendation words.

16. The computer device according to claim 11, wherein the processor performs a step of:

determining the at least one second search recommendation word according to at least one of search data input after the video is browsed or a feature text corresponding to the video.

17. The computer device according to claim 10, wherein the processor performs steps of:

switching to present any other search recommendation word presented in the first area than the any search recommendation word corresponding to a current video search result in the search box of the search result page, in response to a triggering operation on the any other search recommendation word; and switching to present a video search result corresponding to the any other search recommendation word in the second area of the search result page.

* * * * *